(12) United States Patent
Sanderovich et al.

(10) Patent No.: US 10,256,875 B2
(45) Date of Patent: Apr. 9, 2019

(54) TECHNIQUES FOR IMPROVING POWER CONSUMPTION IN COMMUNICATION DEVICES

(71) Applicant: QUALCOMM Incorporated, San Diego, CA (US)

(72) Inventors: Amichai Sanderovich, Atlit (IL); Moran Horesh, Nahalal (IL)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 14/683,585

(22) Filed: Apr. 10, 2015

(65) Prior Publication Data

US 2016/0301453 A1    Oct. 13, 2016

(51) Int. Cl.
| | |
|---|---|
| H04B 7/0426 | (2017.01) |
| H04B 1/04 | (2006.01) |
| H04W 52/52 | (2009.01) |
| H04B 7/06 | (2006.01) |
| H04B 7/08 | (2006.01) |
| H04L 1/00 | (2006.01) |
| H04L 25/03 | (2006.01) |

(52) U.S. Cl.
CPC ......... *H04B 7/0426* (2013.01); *H04B 1/0475* (2013.01); *H04B 7/06* (2013.01); *H04B 7/08* (2013.01); *H04L 1/00* (2013.01); *H04L 1/0003* (2013.01); *H04L 1/0009* (2013.01); *H04L 25/03* (2013.01); *H04W 52/52* (2013.01); *H04B 2001/0416* (2013.01)

(58) Field of Classification Search
None
See application file for complete search history.

(56) References Cited

U.S. PATENT DOCUMENTS

| | | | | |
|---|---|---|---|---|
| 2007/0072652 | A1* | 3/2007 | Shan | H03G 3/3047 455/570 |
| 2008/0112506 | A1* | 5/2008 | Strong | H04L 5/1469 375/300 |
| 2013/0044028 | A1* | 2/2013 | Lea | H01Q 21/24 342/359 |
| 2014/0185551 | A1 | 7/2014 | Sanderovich | |

FOREIGN PATENT DOCUMENTS

WO    WO-2009114629 A1    9/2009

OTHER PUBLICATIONS

International Search Report and Written Opinion—PCT/US2016/021548—ISA/EPO—dated Jun. 9, 2016.

\* cited by examiner

*Primary Examiner* — James P Duffy
(74) *Attorney, Agent, or Firm* — Patterson & Sheridan, L.L.P.

(57) ABSTRACT

Certain aspects of the present disclosure relate to techniques and apparatus for improving power efficiency of a wireless device. The techniques may generally include determining a modulation scheme and transmit direction for transmission of a signal using a plurality of antennas, and controlling, separately, at least one amplifier for each of the plurality of antennas, based on the determined transmit direction and modulation scheme.

30 Claims, 9 Drawing Sheets

TECHNIQUES FOR IMPROVING POWER CONSUMPTION IN COMMUNICATION DEVICES

TECHNICAL FIELD

The invention relates generally to millimeter wave radio frequency (RF) systems and, more particularly, to improving power efficiency of a wireless device by controlling power amplifier (PA) gain based on a transmit direction and modulation scheme.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically comprises active and passive modules. The active modules (e.g., a phased array antenna) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, etc, resulting in higher free space loss. The higher free space loss can be compensated for by using many small antennas, for example arranged in a phased array.

SUMMARY

Certain aspects of the present disclosure provide an apparatus for wireless communication. The apparatus generally includes a processing system configured to determine a modulation scheme and transmit direction for transmission of a signal using a plurality of antennas and separately control at least one amplifier for each of the plurality of antennas, based on the determined transmit direction and modulation scheme; and an interface configured to output the signal for transmission using the plurality of antennas.

Certain aspects of the present disclosure provide a method for improving power consumption of a wireless device. The method generally includes determining a modulation scheme and transmit direction for transmission of a signal using a plurality of antennas; and controlling, separately, at least one amplifier for each of the plurality of antennas, based on the determined transmit direction and modulation scheme.

Certain aspects of the present disclosure provide an apparatus for wireless communication. The apparatus generally includes means for determining a modulation scheme and transmit direction for transmission of a signal using a plurality of antennas; and means for controlling, separately, at least one amplifier for each of the plurality of antennas, based on the determined transmit direction and modulation scheme.

Certain aspects of the present disclosure provide a computer-readable medium comprising instructions executable to determine a modulation scheme and transmit direction for transmission of a signal using a plurality of antennas; and control, separately, at least one amplifier for each of the plurality of antennas, based on the determined transmit direction and modulation scheme.

Certain aspects of the present disclosure provide a wireless node, comprising a plurality of antennas; and a processing system configured to determine a modulation scheme and transmit direction for transmission of a signal using the plurality of antennas; and control, separately, at least one amplifier for each of the plurality of antennas, based on the determined transmit direction and modulation scheme.

DETAILED DESCRIPTION

Aspects of the present disclosure provide techniques for improving power consumption of a wireless device by independently controlling a gain of a plurality of amplifiers corresponding to a plurality of antennas, based on a determined modulation scheme and transmit direction.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
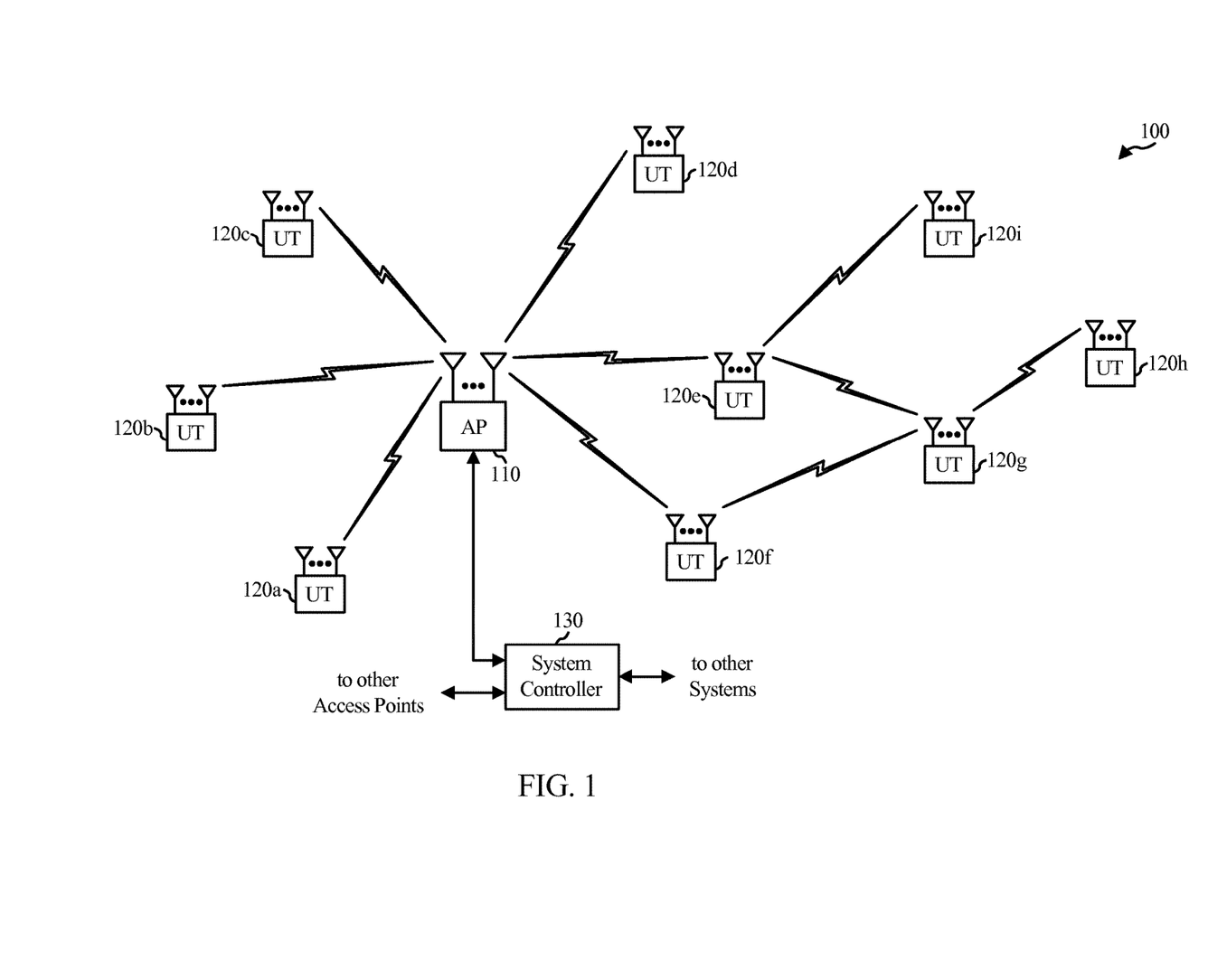
FIG. 1 illustrates a diagram of an example wireless communications network, in accordance with certain aspects of the present disclosure.

FIG. 1 illustrates a multiple-access multiple-input multiple-output (MIMO) system 100 with access points and user terminals in which aspects of the present disclosure may be practiced.

For example, access point 110 or user terminals 120 may determine relative rotation of devices utilizing techniques described herein. In some cases user terminals may be game controllers or the like and the techniques may be applied to determine relative rotation of the game controllers to a game station (acting as an access point).

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
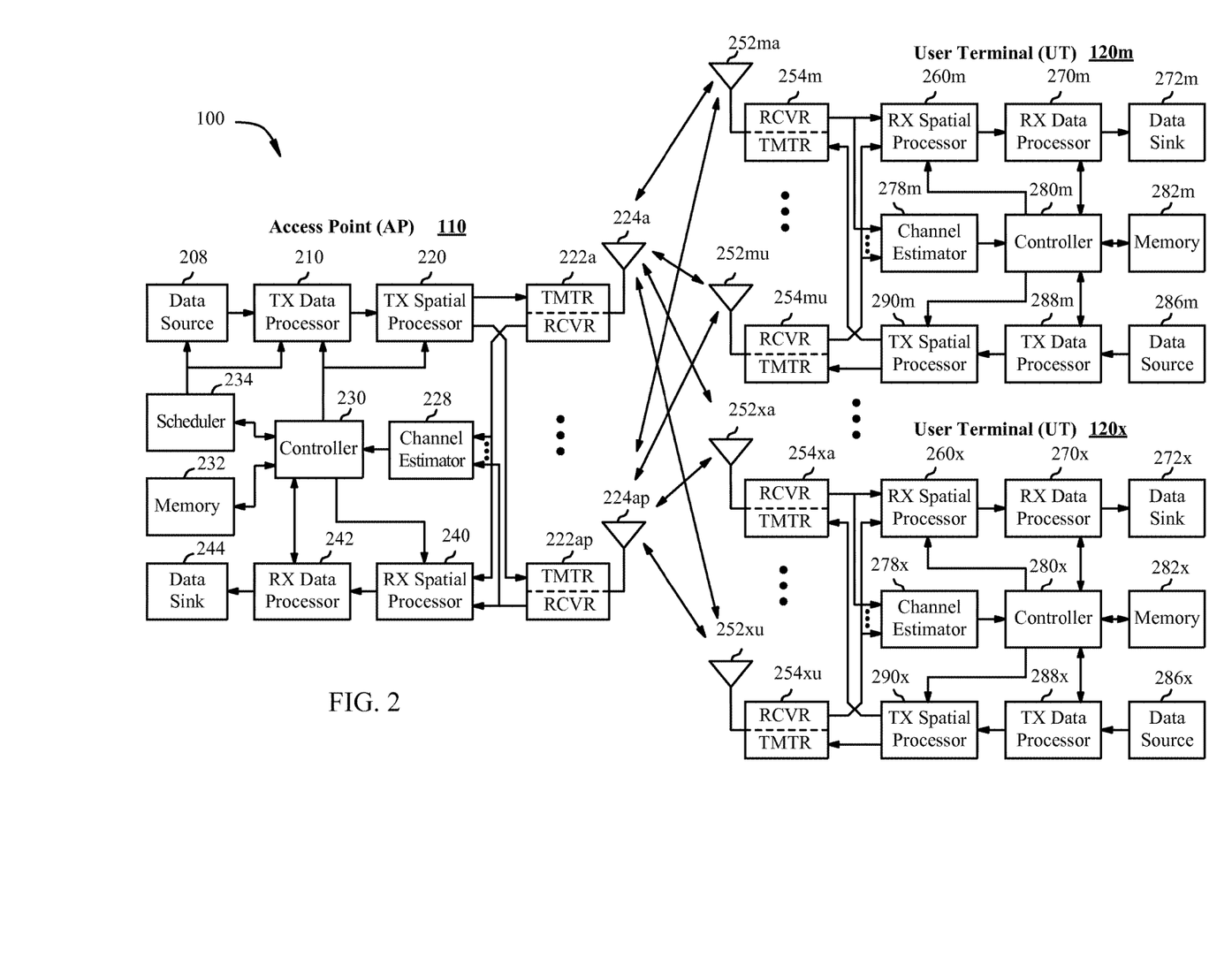
FIG. 2 illustrates a block diagram of an example access point and user terminals, in accordance with certain aspects of the present disclosure.

FIG. 2 illustrates a block diagram of access point 110 and two user terminals 120$m$ and 120$x$ in MIMO system 100 in which aspects of the present disclosure may be practiced. As discussed above, the rotation determination techniques discussed herein may be practiced by an access point 110 or user terminal 120.

The access point 110 is equipped with $N_t$ antennas 224$a$ through 224$t$. User terminal 120$m$ is equipped with $N_{ut,m}$ antennas 252$ma$ through 252$mu$, and user terminal 120$x$ is equipped with $N_{ut,x}$ antennas 252$xa$ through 252$xu$. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224$a$ through 224$ap$ receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

According to certain aspects of the present disclosure, the various processors shown in FIG. 2 may direct the operation at an AP 110 and/or user terminal 120, respectively, to perform various techniques described herein, to determine relative rotation based on training signals and/or other processes for the techniques described herein.

Figure 3:
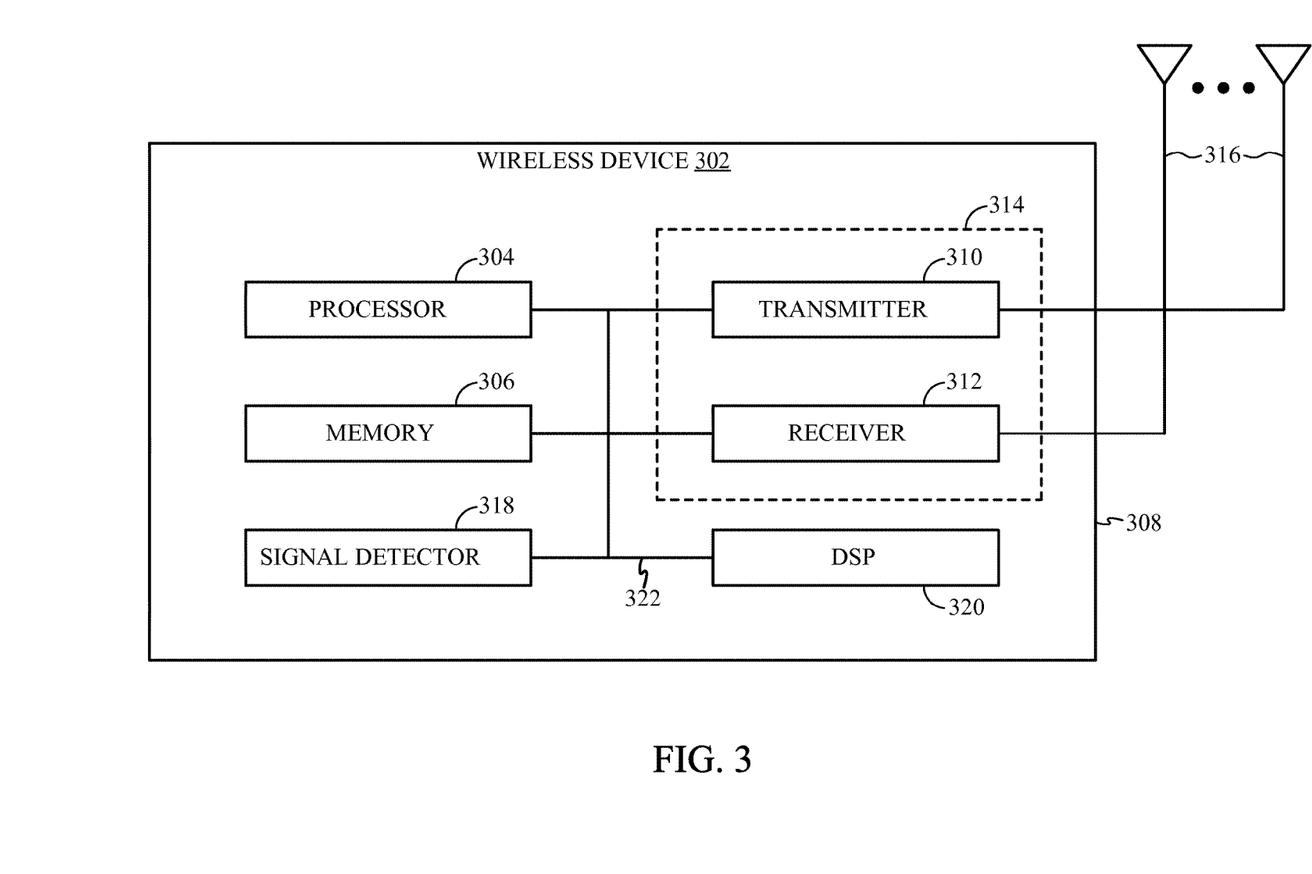
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 600 in FIG. 6 to determine relative rotation and/or other processes for the techniques described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
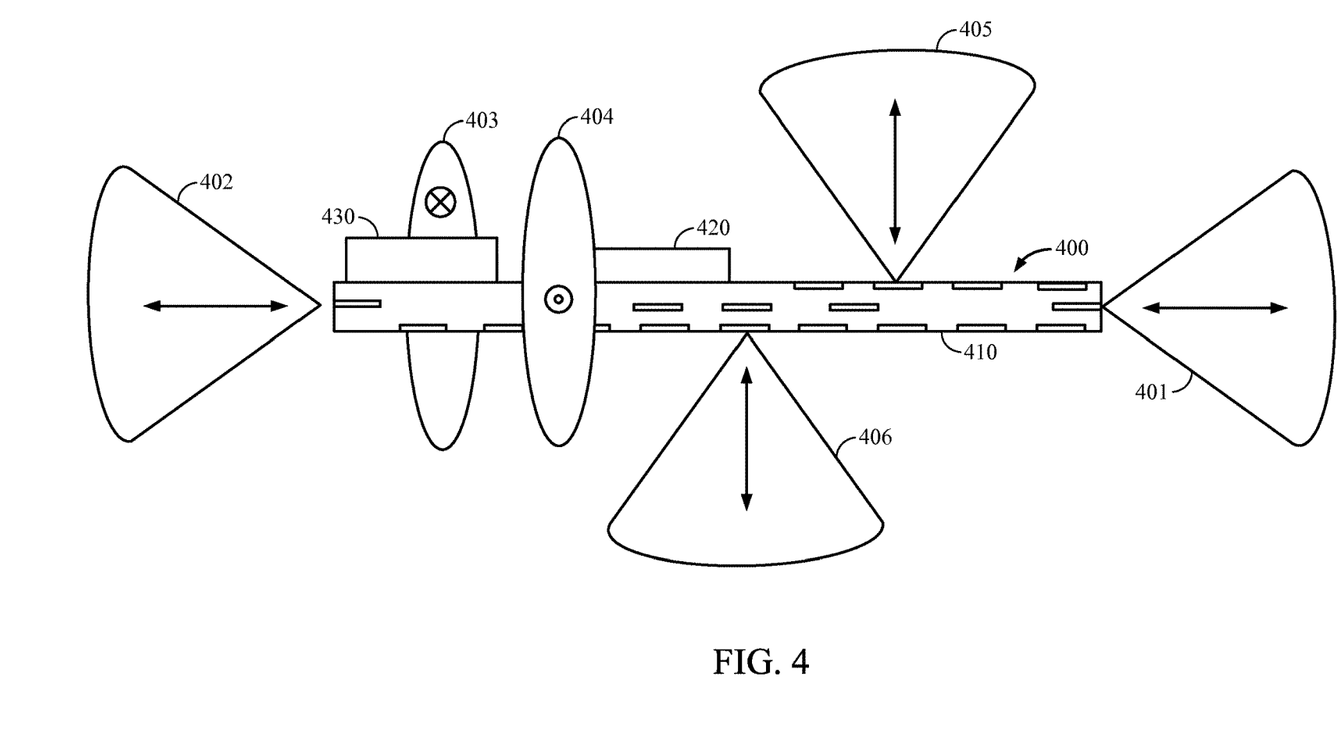
FIG. 4 is a diagram illustrating a radiating pattern of a radio frequency integrated circuit (RFIC), in accordance with certain aspects of the present disclosure.

FIG. 4 illustrates the radiation patterns of a RF module 400 that can be utilized to carry out aspects of the present disclosure. The RF module 400 packages at least the six antenna sub-arrays, an RF circuitry (e.g., in a form of an integrated circuit) 420, and discrete electronic components 430, all of which are fabricated on a multilayer substrate 410 of the RF module 400. The sub-array of antennas that form the active antenna array of the module 400 are designed to receive and transmit millimeter wave signals that propagate, for example, from four sides 401, 402, 403, and 404 of the RF module 400. In addition, signals can propagate upward through the upper surface 405 of the RF module 400 and downward through the bottom surface 406 of the RF module 400.

In one configuration, the RF module 400 is installed in electronic devices to provide millimeter wave applications of the 60 GHz frequency band. Examples for such applications include, but are not limited to, wireless docking, wireless video transmission, wireless connectivity to storage appliances, and the like. The electronic devices may include, for example, smart phones, mobile phones, tablet computers, access points, access terminals, access gateways, electronic kiosks, laptop computers, and the like.

According to one implementation, each element in each antenna sub-array 410 can be independently controlled by the RF circuitry 420. Such control may be performed to provide good coverage in all directions with various polarizations. As a result, signals can be received and/or transmitted through any combination of the six antenna sub-arrays in the RF module 400. Consequently, such signals may be received from any combination of directions. For example, both the antenna sub-arrays in the upper and bottom layers of the substrate 410 may allow reception and transmission of signals through upward and downward directions. Each radiating element in any of the antenna sub-arrays can be independently controlled to further improve and optimize the antenna array in the module 400. It should be noted that each antenna sub-array is configured to transmit and receive millimeter wave signals. In one aspect, each antenna sub-array is configured to transmit and receive radio signals at the 60 GHz frequency band.

Figure 5:
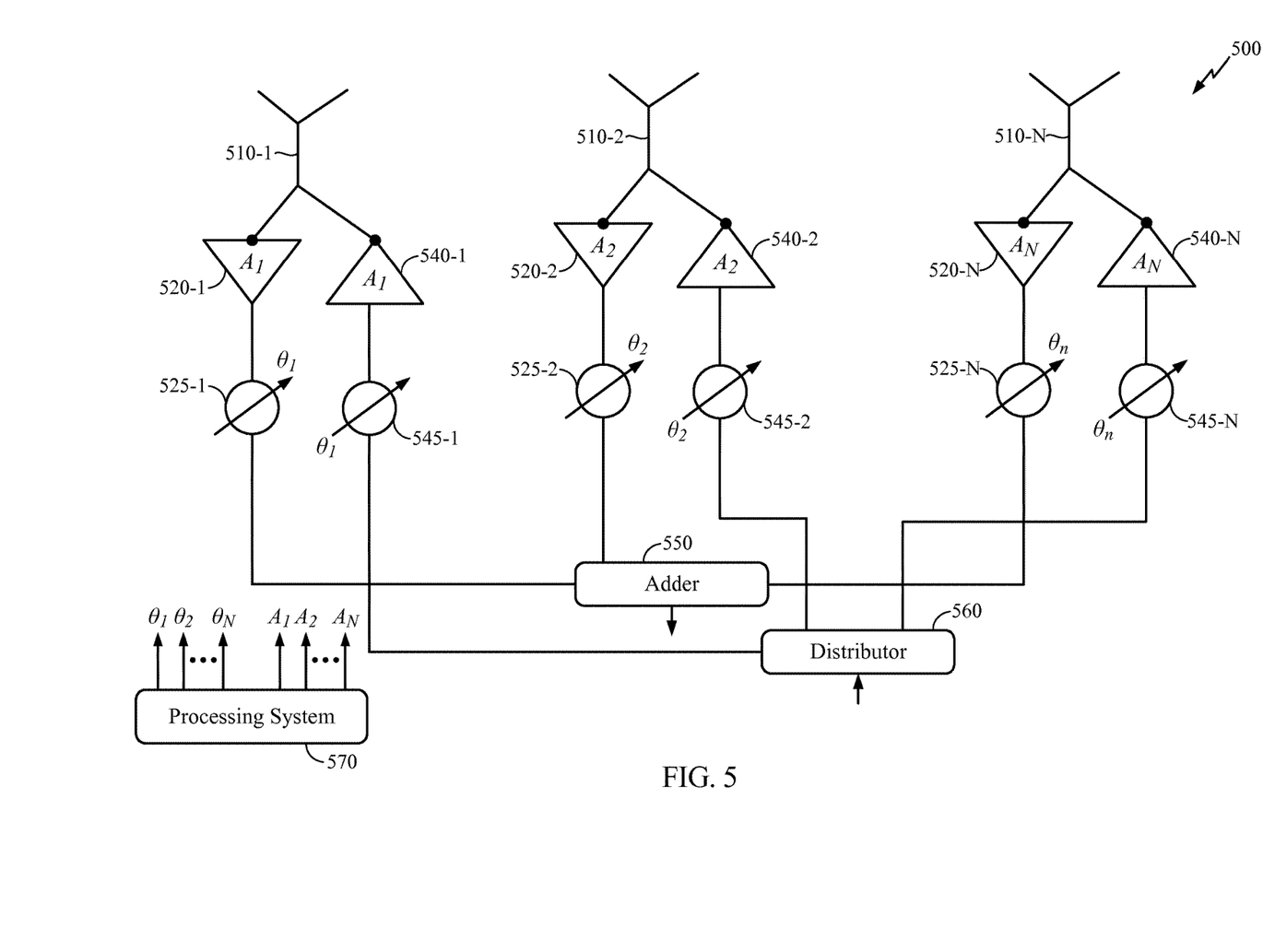
FIG. 5 is a diagram of a phased-array antenna configuration, in accordance with certain aspects of the present disclosure.

FIG. 5 is a diagram of a phased-array antenna 500, in accordance with certain aspects of the present disclosure. The phased-array antenna 500 includes a number N of radiating elements 510-1 through 510-N, each of which is designed to receive and transmit signals, for example, over the 60 GHz frequency band. The different radiating elements 510-1 through 510-N can be constructed using different type of antenna elements.

In the receive direction, each of the radiating elements 510-1 through 510-N are respectively connected to a LNA 520-1 through 520-N (hereinafter referred to collectively as LNAs 520 or individually as an amplifier (e.g., low noise amplifier (LNA)) 520 and a phase shifter 525-1 through 525-N, and is further connected to an adder component 550 that sums the received signals.

In the transmit direction, each of the radiating elements 510-1 through 510-N are respectively connected to a power amplifier (PA) 540-1 through 540-N and to a phase shifter 545-1 through 545-N, and is further connected to a distributor 560 that distributes an incoming RF signal to the radiating elements.

According to certain aspects of the present disclosure, the phase $\theta_i$ of each phase shifter 525 or 545 are individually or independently controlled during the reception or transmission of signals (e.g., based on a modulation scheme used for signal transmission). In addition, the gain $A_i$ of each of the LNAs 520 or PAs 540 are independently controlled during the reception or transmission of signals. Thus, the gains and phases ($A_i$; $\theta_i$, i=1, 2, ... N) of the signal feeds to the elements are individual controlled, thereby optimizing the performance for the phased-array antenna 500 in all directions and all polarizations.

In certain aspects, the controllable components, i.e., the amplifiers 520 and 540 and the phase shifters 525 and 545 are controlled by a processing system 570. The processing system 570 is configured to operate the antenna 500 by adjusting feed gains and phases of the elements 510. In certain aspects, the feed gains and phases may be controlled based on a modulation scheme used for signal transmission and a transmit direction.

In one aspect, the processing system 570 may be integrated in the RF circuitry (for example, RF circuitry 440, FIG. 4). In another aspect, the processing system 570 may be part of a baseband module.

Example Mechanisms for Improving Power Consumption

As illustrated with respect to FIG. 5, multiple power amplifiers (PAs) 520 may be used for signal amplification and each PA may be configured to amplify a signal corresponding to one of a plurality of antennas. The gain of each PA may be independently controlled (e.g., element-wise PAs), as presented above with respect to FIG. 5. Therefore, the average output power of an antenna array may be increased (e.g., optimized) by independently controlling the gain of each PA.

For example, where two antenna arrays radiate to a specific direction for which a first antenna has a higher gain with respect to a second antenna, equal power may be used for both antennas (e.g., because there is a power limit of one, each antenna may transmit at half power).

However, in some cases, power efficiency may be improved if more power is allocated to the first antenna rather than the second antenna because the first antenna has a higher gain (e.g., corresponding to the direction of transmission). The power saving is achieved by allowing the gain for the weaker antennas (e.g., weaker due to its lower gain) to be reduced, so that its PA consumes less power from the battery, and using the power surplus for the stronger antenna (e.g., first antenna having higher gain corresponding to the direction of transmission). This approach may also make the pattern of the array more directed with less sidelobes.

However, while independently controlling gains for each PA corresponding to the plurality of antennas may improve power consumption, using different gains for each PA may be inefficient for constellations with lower modulation and using the same gain on all PAs may be inefficient for constellations with higher modulation. Therefore, it may be desirable to have apparatuses and techniques for improving power efficiency of a wireless device by controlling the gain of the PAs based on a transmit direction as well as a constellation used for signal transmission.

In a wireless communications system, data may be transmitted in accordance with different digital constellations, such as quadrature amplitude modulation (QAM) (e.g., 16QAM), binary phase shift key (BPSK), and quadrature phase shift keying (QPSK), amplitude phase shift keying (APSK). Each of the constellations may have a different peak to average signal ratio. In certain aspects of the present disclosure, knowledge of the different peak to average signal ratios may be used to increase (e.g., optimize) the efficiency of the PAs (e.g., PAs 520) at a transmitter such that the average output signal power is increased (e.g., maximized) per constellation. In some cases, this may be achieved without distorting the signal sent to each antenna for transmission by controlling the gain at the input to the PA and the PA gain.

Figure 6:
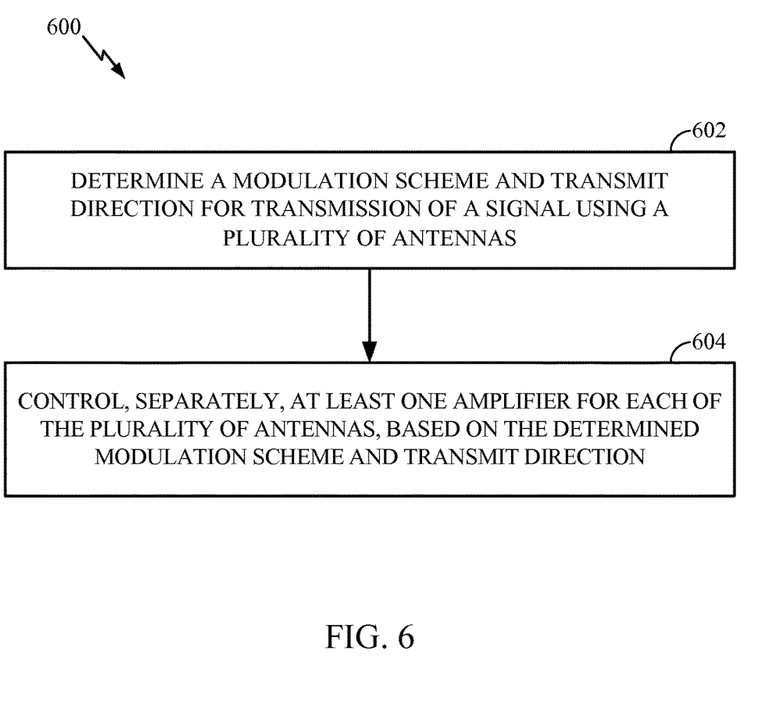
FIG. 6 illustrates example operations for improving power consumption by controlling a gain of a plurality of amplifiers, in accordance with certain aspects of the present disclosure.

FIG. 6 illustrates example operations 600 for improving power consumption by controlling a gain of a plurality of amplifiers, in accordance with certain aspects of the present disclosure. The operations 600 may be performed, for example, by a wireless node, such as the wireless device 302 of FIG. 3.

The operations 600 begin, at 602, by determining a modulation scheme and transmit direction for transmission of a signal using a plurality of antennas. In certain aspects, the determination at 602 may be based on a channel conditions or a training sequence. At 604, the wireless node controls at least one amplifier for each of the plurality of antennas, based on the determined transmit direction and modulation scheme.

Figure 7:
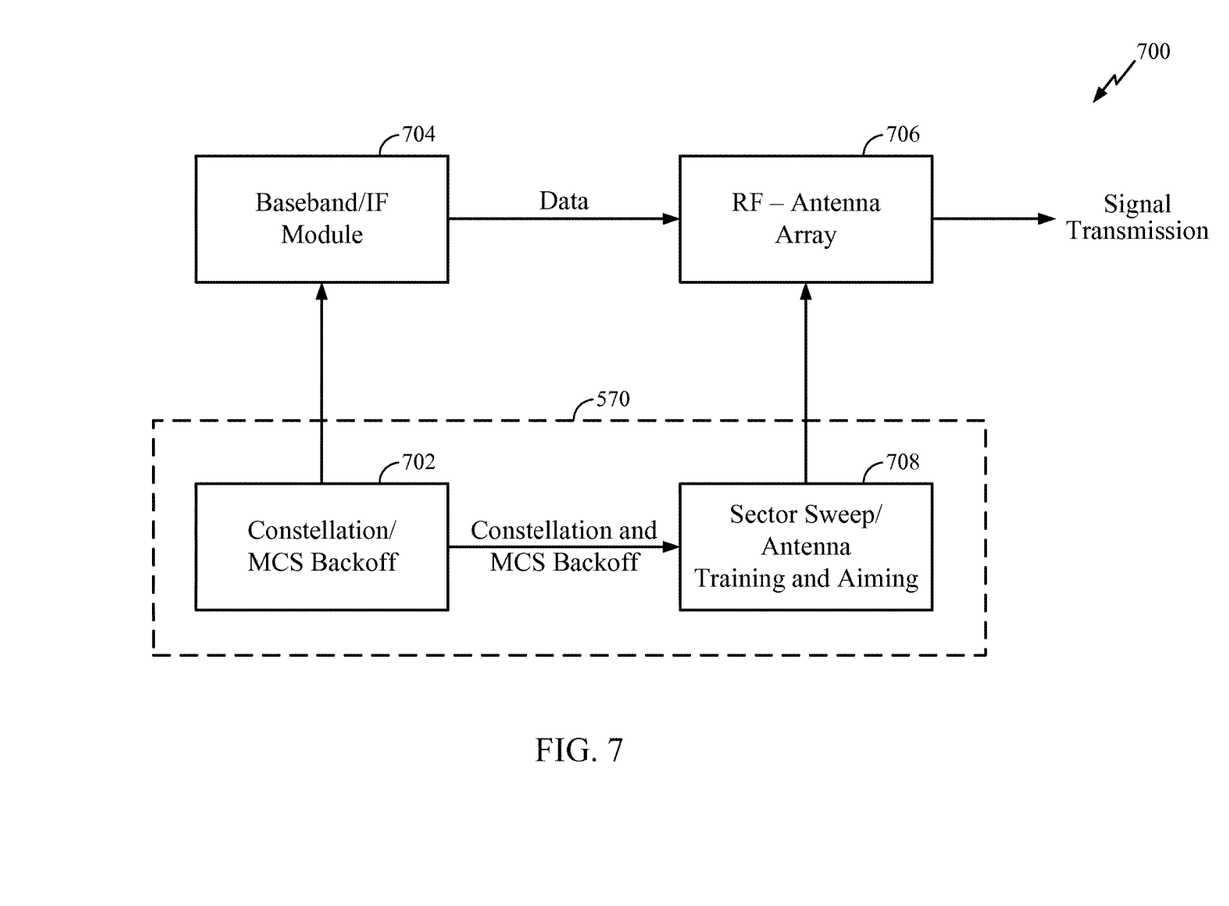
FIG. 7 is a block diagram of a baseband and intermediate frequency (IF) module and processing system configured to transmit signals via an antenna array, in accordance with certain aspects of the present disclosure.

FIG. 7 is a block diagram 700 of a baseband and intermediate frequency (IF) module 704 and processing system 570 configured to carry out the operations presented in FIG. 6 and transmit signals via an antenna array 706, in accordance with certain aspects of the present disclosure.

The block diagram 700 comprises a constellation/modulation coding scheme (MCS) backoff module (hereinafter, MCS module 702), which may be part of a processing system, such as the processing system 570 of FIG. 5. The MCS module 702 may determine an MCS (e.g., constellation) to be used for signal transmission and modulate a signal for transmission in accordance with the determined modulation scheme. In certain aspects, the MCS module 702 may also determine a PA backoff value, based on the constellation.

A baseband and intermediate frequency (IF) module 704 may be configured to upconvert the modulated signal from a baseband frequency to an RF frequency. The upconverted signal (e.g., data) may be sent to an antenna array 706 for transmission. A sector sweep and antenna training and aiming module (hereinafter, aiming module 708) may be configured to control a plurality of amplifiers (e.g., PAs 540) and phase shifters (e.g., phase shifter 525) to direct the signal transmission in a specific direction. In certain aspects of the present disclosure, the aiming module 708 may receive information regarding a selected modulation scheme and MCS backoff from the MCS module 702.

Based on at least one of the modulation scheme, MCS backoff, and a selected transmit direction, the aiming module 708 may control the gain of the amplifiers. For example, the aiming module 708 may use known peak to average signal ratios corresponding to each constellation (e.g., QPSK or 16QAM) to control the PAs and optimize the efficiency of a wireless device. For example, the gain at the input of the PA and the PA gain may be controlled (e.g., changing the array pattern) based on the modulation scheme of a constellation used for signal transmission. In certain aspects, the aiming module 708 may be part of a processing system, such as the processing system 570 of FIG. 5.

Figure 8A:
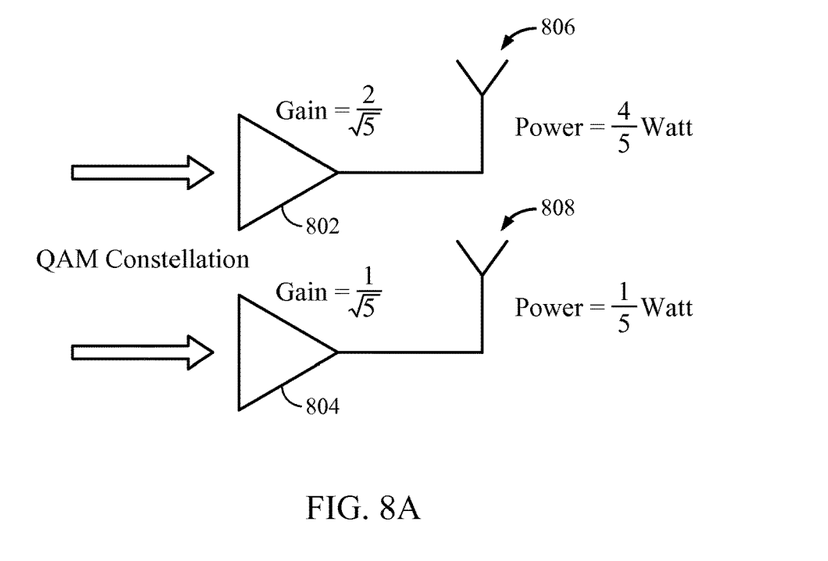
FIGS. 8A and 8B are diagrams of example amplifier gains determined based on a constellation used for signal transmission, in accordance with certain aspects of the present disclosure.

FIG. 8A illustrates an example PA gain for a QAM constellation (e.g., non-constant amplitude), in accordance with certain aspects of the present disclosure. When using a non-constant amplitude modulation scheme (e.g., QAM (16QAM, or 64QAM) or orthogonal frequency-division multiplexing (OFDM)), each PA may be configured to have a higher gain as compared to a gain used for a lower modulation schemes. Moreover, an input signal to the PA may be attenuated. For example, by increasing the PA gain and attenuating the input signal, the PA may be configured to operate in the linear region.

Moreover, in some cases, the PAs may be configured to have different gains in order to maximize transmit power while keeping low power consumption. For example, as presented above, power efficiency may be improved if greater power is allocated to an antenna having a higher gain corresponding to a direction of transmission. Therefore, based on the direction of transmission and the constellation, a gain for a first PA 802 may be set at a level (e.g., $2/\sqrt{5}$) that is higher than a gain of a second PA 804 (e.g. $1/\sqrt{5}$). Therefore, power saving is achieved by allowing the gain for the weaker antennas (e.g., antenna 808 having a lower gain) to be reduced (e.g., by reducing the corresponding PA 804 gain) such that the corresponding PA 804 consumes less power from the battery.

This power surplus may then be used for the stronger antenna (e.g., antenna 806) having a higher gain. Therefore, antenna 806 may be operated at a higher power (e.g., $4/5$ Watt) than antenna 808 (e.g., $1/5$ Watt). This approach may improve power efficiency by 0.45 dB, for example.

Figure 8B:
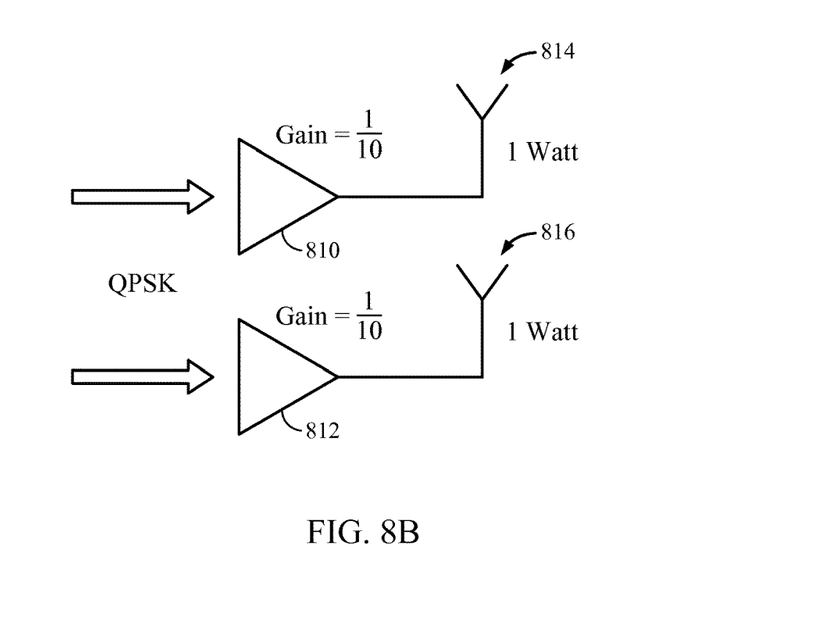

FIG. 8B illustrates an example PA gain for a QPSK constellation (e.g., constant amplitude), in accordance with certain aspects of the present disclosure. When using a constant amplitude modulation scheme (e.g., QPSK or BPSK), the PAs 810 and 812 may be operating within a compression region (e.g., maximally compressed output) because linearity is less of a concern (especially for mmWave signals where interference is weak). For example, the input signal to the PAs may be increased (e.g., maximized) for constellations such as QPSK and BPSK, having constant amplitude, for example.

Therefore, as illustrated, if a constellation of a signal for transmission is QPSK, the gain at the PAs 810 and 812 may be reduced (e.g., operating at minimum or low gain of $1/10$) in order to increase efficiency, which may change the sector used for signal transmission, for example. As a result, the power consumption of the PAs is reduced (e.g., minimized) while the output power is increased (e.g., maximized). Therefore, both antennas 814 and 816 may be operated at equal power (e.g., 1 Watt).

Of course, the particular antenna arrangements and gain values in the relatively simple examples shown in FIGS. 8A and 8B are for illustrative purposes only. Those skilled in the art will recognize that any variety of suitable gain values may be used, for example, depending on a particular combination of direction, modulation scheme, and number and variety of antennas in a given array.

Figure 6A:
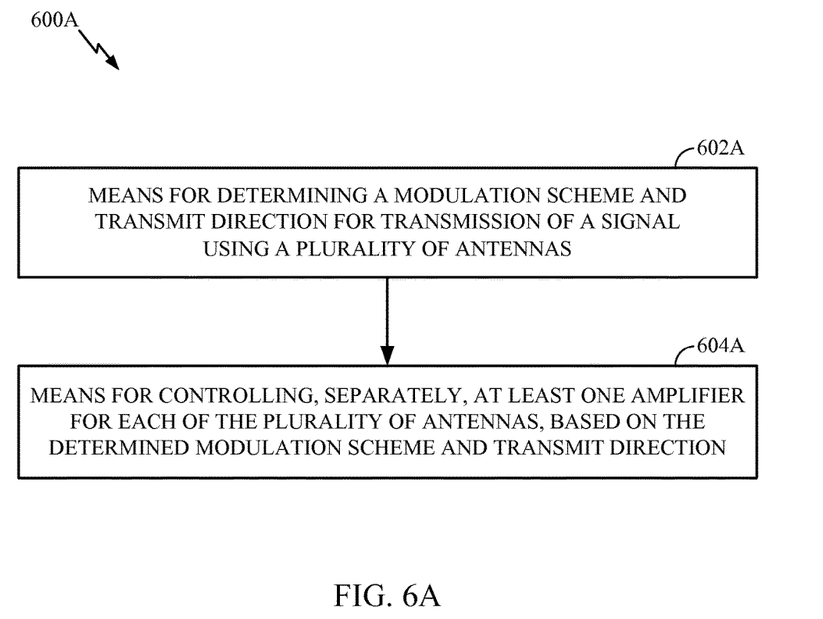
FIG. 6A illustrates example components capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A.

For example, means for receiving may comprise a receiver (e.g., the receiver unit 222, 254) and/or an antenna(s) 224, 254 illustrated in FIG. 2 or the receiver 312 and/or antenna(s) 316 depicted in FIG. 3. Means for transmitting may comprise a transmitter (e.g., the transmitter unit 222) and/or an antenna(s) 224 of the access point 110 illustrated in FIG. 2 or the receiver 312 and/or antenna(s) 316 depicted in FIG. 3. Means for processing, means for controlling, means for determining, means for estimating, means for obtaining, means for outputting or means for calculating comprise a processing system, which may include one or more processors, such as the RX data processor 242, 270 the TX data processor 210, 288 and/or the controller 230, 280 illustrated in FIG. 2 or the processor 304 and/or the DSP 320 portrayed in FIG. 3.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for determining rotation.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a processing system configured to:
determine a modulation scheme and transmit direction for transmission of a signal using a plurality of antennas;
decide whether to set a gain of at least one amplifier for each of a plurality of antennas with different gains based on the modulation scheme;
separately control the gain of the at least one amplifier for each of the plurality of antennas, based on the determined transmit direction and modulation scheme and further based on the decision of whether to set the gain of the at least one amplifier for each of the plurality of antennas with different gains; and
an interface configured to output the signal for transmission using the plurality of antennas.

2. The apparatus of claim 1, wherein the modulation scheme comprises quadrature amplitude modulation (QAM), phase-shift keying (PSK) or amplitude phase shift keying (APSK).

3. The apparatus of claim 1, wherein the determined modulation scheme comprises a constant amplitude modulation scheme and wherein the processing system is configured to control the gain of the at least one amplifier by setting all active amplifiers for each of the plurality of antennas to a minimum gain, based on the determination of the constant amplitude modulation scheme.

4. The apparatus of claim 3, wherein the processing system is configured to increase power of a signal to be provided to the at least one amplifier, based on the determination of the constant amplitude modulation scheme.

5. The apparatus of claim 3, wherein the constant amplitude modulation scheme comprises quadrature phase shift key (QPSK) or binary phase shift key (BPSK).

6. The apparatus of claim 1, wherein the determined modulation scheme comprises a non-constant amplitude modulation scheme and wherein the processing system is configured to control the gain of the amplifiers such that the gain of each amplifier for each of the plurality of antennas is different, based on the determination of the non-constant amplitude modulation scheme.

7. The apparatus of claim 6, wherein the processing system is configured to control the gain of the amplifiers by increasing the gain of the amplifier for each of the plurality of antennas, based on the determination of the non-constant amplitude modulation scheme.

8. The apparatus of claim 6, wherein the processing system is configured to decrease power of a signal to be provided to the at least one amplifier, based on the determination of the non-constant amplitude modulation scheme.

9. The apparatus of claim 6, wherein the non-constant amplitude modulation scheme comprises 16 quadrature amplitude modulation (16 QAM) or 64 QAM or orthogonal frequency-division multiplexing (OFDM).

10. The apparatus of claim 1, wherein the decision comprises:
deciding to set the gain of the at least one amplifier for each of the plurality of antennas with different gains if the modulation scheme is a non-constant amplitude modulation scheme; and
deciding to set the gain of the at least one amplifier for each of the plurality of antennas with the same gains if the modulation scheme is a constant amplitude modulation scheme.

11. A method for wireless communication, comprising:
determining a modulation scheme and transmit direction for transmission of a signal using a plurality of antennas;
deciding whether to set a gain of at least one amplifier for each of a plurality of antennas with different gains based on the modulation scheme;
controlling, separately, the gain of the at least one amplifier for each of the plurality of antennas, based on the determined transmit direction and modulation scheme and further based on the decision of whether to set the gain of the at least one amplifier for each of the plurality of antennas with different gains; and
outputting the signal for transmission using the plurality of antennas.

12. The method of claim 11, wherein the modulation scheme comprises quadrature amplitude modulation (QAM), phase-shift keying (PSK) or amplitude phase shift keying (APSK).

13. The method of claim 11, wherein the determined modulation scheme comprises a constant amplitude modulation scheme and wherein controlling the gain of the at least one amplifier comprises setting all active amplifiers for each of the plurality of antennas to a minimum gain, based on the determination of the constant amplitude modulation scheme.

14. The method of claim 13, further comprising increasing power of a signal to be provided to the at least one amplifier, based on the determination of the constant amplitude modulation scheme.

15. The method of claim 13, wherein the constant amplitude modulation scheme comprises quadrature phase shift key (QPSK) or binary phase shift key (BPSK).

16. The method of claim 11, wherein the determined modulation scheme comprises a non-constant amplitude modulation scheme and wherein controlling the gain of the amplifiers comprises controlling the gain of the amplifiers such that the gain of each amplifier for each of the plurality of antennas is different, based on the determination of the non-constant amplitude modulation scheme.

17. The method of claim 16, wherein controlling the gain of the amplifiers comprises increasing the gain of the amplifier for each of the plurality of antennas, based on the determination of the non-constant amplitude modulation scheme.

18. The method of claim 16, further comprising decreasing power of a signal to be provided to the at least one amplifier, based on the determination of the non-constant amplitude modulation scheme.

19. The method of claim 16, wherein the non-constant amplitude modulation scheme comprises 16 quadrature amplitude modulation (16 QAM) or 64 QAM or orthogonal frequency-division multiplexing (OFDM).

20. An apparatus for wireless communication, comprising:
means for determining a modulation scheme and transmit direction for transmission of a signal using a plurality of antennas;
means for deciding whether to set a gain of at least one amplifier for each of a plurality of antennas with different gains based on the modulation scheme;
means for controlling, separately, the gain of the at least one amplifier for each of the plurality of antennas, based on the determined transmit direction and modulation scheme and further based on the decision of whether to set the gain of the at least one amplifier for each of the plurality of antennas with different gains; and
means for outputting the signal for transmission using the plurality of antennas.

21. The apparatus of claim 20, wherein the modulation scheme comprises quadrature amplitude modulation (QAM), phase-shift keying (PSK) or amplitude phase shift keying (APSK).

22. The apparatus of claim 20, wherein the determined modulation scheme comprises a constant amplitude modulation scheme and wherein the means for controlling the gain of the at least one amplifier comprises means for setting all active amplifiers for each of the plurality of antennas to a minimum gain, based on the determination of the constant amplitude modulation scheme.

23. The apparatus of claim 22, further comprising means for increasing power of a signal to be provided to the at least one amplifier, based on the determination of the constant amplitude modulation scheme.

24. The apparatus of claim 22, wherein the constant amplitude modulation scheme comprises quadrature phase shift key (QPSK) or binary phase shift key (BPSK).

25. The apparatus of claim 20, wherein the determined modulation scheme comprises a non-constant amplitude modulation scheme and wherein means for controlling the gain of the amplifiers comprises means for controlling the gain of the amplifiers such that the gain of each amplifier for each of the plurality of antennas is different, based on the determination of the non-constant amplitude modulation scheme.

26. The apparatus of claim 25, wherein means for controlling the gain of the amplifiers comprises means for increasing the gain of the amplifier for each of the plurality of antennas, based on the determination of the non-constant amplitude modulation scheme.

27. The apparatus of claim 25, further comprising means for decreasing power of a signal to be provided to the at least one amplifier, based on the determination of the non-constant amplitude modulation scheme.

28. The apparatus of claim 25, wherein the non-constant amplitude modulation scheme comprises 16 quadrature amplitude modulation (16 QAM) or 64 QAM or orthogonal frequency-division multiplexing (OFDM).

29. A non-transitory computer-readable medium comprising instructions executable to:
determine a modulation scheme and transmit direction for transmission of a signal using a plurality of antennas;
decide whether to set a gain of at least one amplifier for each of a plurality of antennas with different gains based on the modulation scheme;
control, separately, the gain of the at least one amplifier for each of the plurality of antennas, based on the determined transmit direction and modulation scheme and further based on the decision of whether to set the gain of the at least one amplifier for each of the plurality of antennas with different gains; and
output the signal for transmission using the plurality of antennas.

30. A wireless node, comprising:
a plurality of antennas; and
a processing system configured to:
determine a modulation scheme and transmit direction for transmission of a signal using the plurality of antennas; and
decide whether to set a gain of at least one amplifier for each of a plurality of antennas with different gains based on the modulation scheme;
control, separately, the gain of the at least one amplifier for each of the plurality of antennas, based on the determined transmit direction and modulation scheme and further based on the decision of whether to set the gain of the at least one amplifier for each of the plurality of antennas with different gains; and
output the signal for transmission using the plurality of antennas.

* * * * *